United States Patent [19]

Bernstein et al.

[11] Patent Number: 4,630,635
[45] Date of Patent: Dec. 23, 1986

[54] FLOW DEVICE WITH RESILIENT ELASTOMERIC SLEEVE

[75] Inventors: Robert E. Bernstein, Framingham; Alan E. Nelson, Franklin, both of Mass.

[73] Assignee: Larad Equipment Corporation, Medfield, Mass.

[21] Appl. No.: 769,783

[22] Filed: Aug. 23, 1985

Related U.S. Application Data

[63] Continuation of Ser. No. 441,613, Feb. 11, 1983, abandoned.

[51] Int. Cl.⁴ .............................................. F16K 43/00
[52] U.S. Cl. ........................................ 137/315; 251/5; 251/148; 138/109; 285/238; 285/354
[58] Field of Search ................... 137/315; 251/4, 5, 6, 251/7, 8, 148; 138/109; 285/238, 347, 354, 404

[56] References Cited

U.S. PATENT DOCUMENTS

| | | | |
|---|---|---|---|
| 1,709,949 | 4/1929 | Rasmussen et al. | 166/85 |
| 2,459,609 | 1/1949 | Wolfram | 285/354 |
| 2,590,215 | 3/1952 | Sausa | 138/45 |
| 2,627,874 | 2/1953 | Johnson | 137/688 |
| 2,786,642 | 3/1957 | Comb | 251/30 |
| 2,995,335 | 4/1957 | Raftis | 251/5 |
| 3,090,591 | 5/1963 | Clarkson | 251/5 |
| 3,145,967 | 8/1964 | Gardner | 251/5 |
| 3,197,173 | 7/1965 | Taubenheim | 251/6 |
| 3,204,919 | 9/1965 | Tripol et al. | 251/8 |
| 3,285,563 | 11/1966 | Clarkson | 251/8 |
| 3,353,560 | 11/1967 | McCulloh | 138/30 |
| 3,354,970 | 11/1967 | Lummus | 175/218 |
| 3,483,892 | 12/1969 | Sugimura | 137/601 |
| 3,514,034 | 5/1970 | Cushman | 237/8 |
| 3,971,579 | 7/1976 | Brown | 285/404 |
| 4,125,125 | 11/1978 | Ezekoye et al. | 137/315 |
| 4,135,550 | 1/1979 | Andersson | 137/565 |
| 4,195,810 | 4/1980 | Lavin | 251/5 |
| 4,252,349 | 2/1981 | Mahoff | 285/238 |
| 4,268,005 | 5/1981 | Raftis et al. | 251/5 |
| 4,303,222 | 1/1981 | Campbell | 251/7 |
| 4,363,505 | 12/1982 | Smith | 285/404 |

OTHER PUBLICATIONS

Declaration of Robert E. Bernstein and Exhibits.

Primary Examiner—Martin P. Schwadron
Assistant Examiner—Sheri M. Novack
Attorney, Agent, or Firm—Neuman, Williams, Anderson & Olson

[57] ABSTRACT

A pinch valve in which a sleeve is contained in a housing, the motive fluid is sealed between the sleeve and the housing interior, and the sleeve is fixed in position in the housing. Also, the process fluid can be sealed between the sleeve and the line piping.

15 Claims, 3 Drawing Figures

FLOW DEVICE WITH RESILIENT ELASTOMERIC SLEEVE

This application is a continuation of application Ser. No. 441,613, filed Feb. 11, 1983, now abandoned.

BACKGROUND OF THE INVENTION

1. Field of the Invention

A pinch valve for regulating, throttling or stopping the flow of a fluid.

2. Description of the Prior Art

Pinch valves are commonly used in the chemical process industry, food industry, mining, metallurgy, plating and indeed any industry where liquids containing solids, such as slurries, are made to flow. They are used for both on/off and flow control situations. The general distinctions and advantages of pinch valves over other types of valves are well known and recognized.

The basic construction of a pinch valve consists of a flexible resilient elastomeric sleeve installed in a fluid process line together with means to constrict the sleeve so as to regulate, throttle or terminate the flow of the fluid through the line.

Problems with leakage, ease and speed of installation and repair, verification of operability, cost and complexity of the valve have long been the subject of pinch valve design efforts.

Some pinch valves employ a mechanical pinch mechanism to constrict the sleeve. The majority of pinch valves manufactured today consist of a flanged elastomeric sleeve in which the sleeve is fitted either into a one-piece housing (by distorting the elastomer flange and pushing the sleeve into the housing) or more commonly, in a split housing with its associated sealing gaskets and bolts. The sleeve flange is outside the housing and is sandwiched between flanges on the housing and the line piping and serves to seal the valve against leakage of process fluids. Where adjustment of the valve is by a motive fluid, for example air or hydraulic fluid, which squeezes the intermediate portion of the sleeve, the flange also serves to seal the motive fluid.

Replacement of sleeves in prior art valves is time consuming. For example, in order to replace a damaged sleeve in a flanged pinch valve of the direct air actuated type, the air supply is disconnected, then flange bolts connecting the valve to the mating pipe flanges are removed. The valve is taken out of the piping system and the split valve housing opened in order to remove the sleeve. A new sleeve is placed in the housing and the housing bolted together with its attendant gasket sealing. The sleeve-housing assembly is then reinstalled into the piping system by bolting the valve flange to the pipe flanges, and reconnecting the air supply. Normally the new sleeve would then be proof-tested in the piping system to qualify the integrity of the sleeve.

SUMMARY OF THE INVENTION

The present invention is a pinch valve which has all of the advantages of prior pinch valve designs while incorporating new features which allow faster, easier installation of the sleeve in the housing, and of the sleeve-housing assembly into the piping system. It also allows proof testing of a new valve or a replacement sleeve prior to its installation into the piping system. In addition, it is possible to open and alter the downstream piping, disconnecting the downstream side of the valve, while the valve is in the OFF position in the pipe system. Further, the present invention provides improved sealing, particularly in sealing the motive fluid and process fluids by independent means. The valve may be installed in any rotational position.

The pinch valve of the present invention includes a hollow valve housing for mounting in a pipe system. Inside the housing is a sleeve made of a flexible resilient elastomeric material. At each end of the sleeve and integral with it is a rigid portion. Between the inside of the cylinder and the outside of the sleeve, motive fluid may be pressurized to pinch the intermediate portion of the sleeve. A seal is placed between the housing and the rigid portion at each end of the sleeve to prevent leakage of motive fluid. At each end of the sleeve there is a separate interior seal for sealing against the pipe system to prevent leakage of process fluid. In the preferred embodiment the sleeve is effectively flush with the housing so the valve can be readily removed from the line. This also allows the use of end connectors and union fittings for rapid easy installation and removal. The sleeve is fixed at each end to the housing, so the valve can be proof-tested off line, the seal of motive fluid being maintained. Also, when on-line fixing the position of the sleeve at each end prevents disturbing the interior seal.

In one preferred embodiment, the sleeve assembly is an elastomeric tube bonded at both ends to a rigid end ring, such as metal, forming a spool-sleeve assembly. A peripheral groove on each end ring contains an O-ring which bears against the housing for sealing the motive fluid. The axial position is fixed by positioning elements extending between the housing and the end ring, where upon removal of the elements the spool-sleeve assembly can be removed from the housing. Process fluid is sealed by the interior seal, preferably being an elastomeric bead backed-up by the rigid end ring. Thus on installation the end ring positioned is fixed by the positioning elements and the bead is compressed between it and the end connector.

DETAILED DESCRIPTION OF THE PREFERRED EMBODIMENTS

Figure 1:
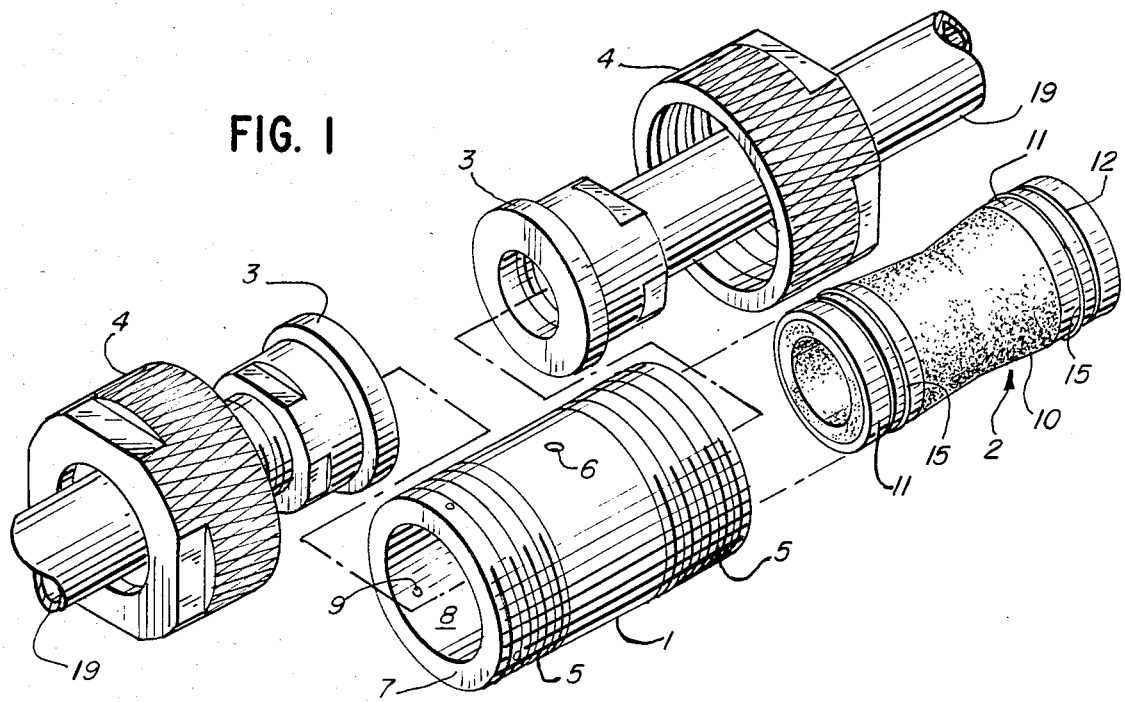
FIG. 1 is an exploded perspective view of the pinch valve.
Figure 2:
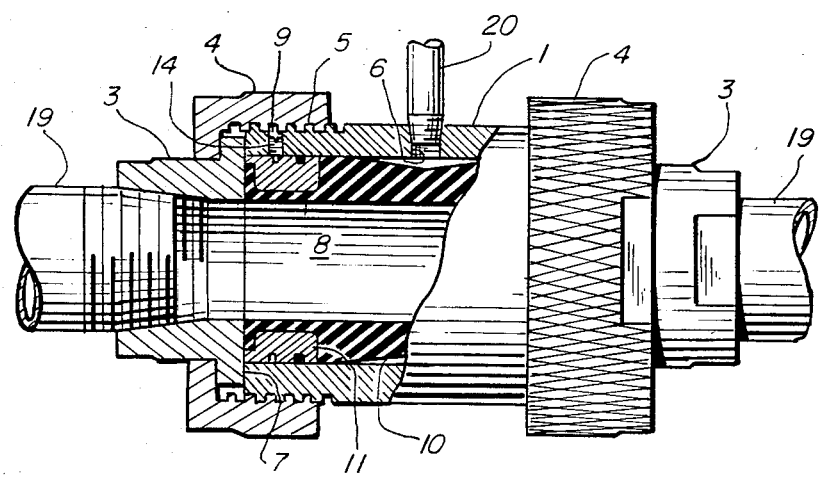
FIG. 2 is a sectional view of the pinch valve through line 2—2 of FIG. 1.

Referring to FIGS. 1 and 2, the pinch valve has a hollow cylindrical housing 1, and a spool-sleeve assembly 2. End connectors 3 and union nuts 4 are also provided. These would usually be supplied with the valve.

The housing 1 has external threads 5 at each end, a centrally located threaded hole 6, end faces 7, an interior wall 8 and a series of threaded holes 9, extending radially through the wall of housing 1 and located evenly distributed peripherally around it near the end faces 7. Three such threaded holes, located 120 degrees apart, are exemplary.

Figure 3:
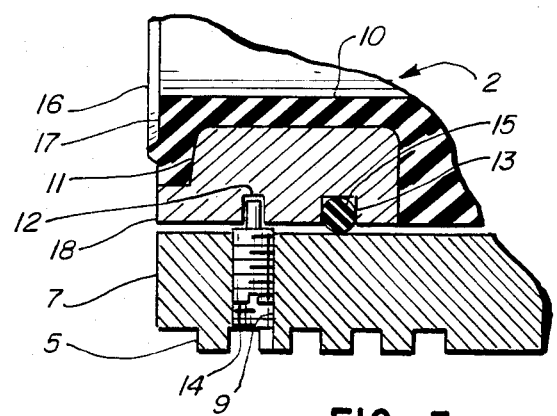
FIG. 3 is a magnified view of the portion 3 of FIG. 2.

The spool-sleeve assembly 2 best seen in FIG. 1 and FIG. 3 comprises a resilient flexible elastomeric sleeve portion 10, for containing and controlling process fluid flowing through the valve, and rigid end ring portions 11. The end ring portions 11 may be made of metal or plastic, or the required rigidity may be achieved in a single molded piece, depending on the forces to be encountered in particular applications and other considerations of use or cost. For example, where the end ring portions 11 are made of metal they are attached by use of an appropriate adhesive. Of course, a variety of adhesives and materials can be chosen to suit particular applications.

As best shown in FIG. 3, in the preferred embodiment the end ring portions have an outer-peripheral retaining groove 12 and a sealing groove 13. The retaining groove 12 receives the dog-end of full-dog set screws 14 which are screwed into the threaded holes 9, three at each end of the assembly. An O-ring 15 is fitted into sealing grooves 13 and seals against the interior wall 8 of the housing 1. A bead 16 is formed around the end face 17 of the spool-sleeve assembly 2. The bead 16 is backed up by the rigid end ring portions 11, so that when the bead 16 is compressed in this particular embodiment as explained below, the sealing effect is highly effective. Also a shoulder of the end ring portions 11 extends to and is part of end face 17 at 18, however this shoulder is not necessary; instead the elastomeric material could extend all the way out. The spool sleeve assembly 2 is made to be effectively flush at each end with the end faces 7 of the housing 1, although the bead 16 extends beyond the end face 7 so that it can compress and seal as described below. By the term "effectively flush" it is not meant to imply exact co-termination, but rather that the housing and sleeve assembly may be installed in and removed from a piping system by sideways movement without specific disassembly of any part of the piping system. It is contemplated that slight extension of the sleeve beyond the housing or vice versa would still permit the easy installation and removal contemplated by this invention.

As most clearly shown in FIG. 2, when fully installed and in operation in pipe line 19, process fluid containing liquid and solids flows through the pinch valve. The union nuts 4 are tightened to force the end connectors 3 against the end faces 7 of the housing 1 thereby compressing the bead 16 into sealing engagement with an opposing surface of the end connector 3. To control flow of the process fluid, a motive fluid, commonly, compressed air or hydraulic fluid fills the actuating space between which the housing 1 and the outside of the sleeve portion 10, and is pressurized by an actuating mechanism acting through the line 20. The pressure squeezes or pinches the sleeve portion 10, restricting flow. Means for controlling the pressure of the motive fluid are not shown as such means are commonly known by those practicing this field. The motive fluid is sealed against leakage by the O-rings 15 bearing against the interior wall 8 of the housing 1.

An alternate method of actuating is to store a motive fluid preferably a hydraulic fluid in the actuating space and use a piston or plug in a cylinder, to pressurize the fluid pinching the sleeve. The plug or piston can be moved by a mechanical means such as a quarter-turn mechanism.

The shape and rigidity of the end ring portions 11 and their being adhered to the sleeve as shown in FIG. 3 prevents the forces imposed by movement of the sleeve during actuation of the valve from interfering with sealing action of the O-ring 15. Also the set-screws 14 acting in conjunction with the end ring portions 11 cause sealing integrity of the bead 16 to be maintained despite movements and forces occuring during actuation of the valve or occasioned by line pressure inside the sleeve.

By this construction, sealing of the motive fluid and of the process fluid is isolated from the stress and working of the sleeve and from each other. Improved sealing is thereby accomplished.

An important advantage of the construction of our invention includes convenience and economics in replacement of the spool-sleeve assembly 2. This is accomplished by disconnecting the air supply, backing off the union nuts 4 and sliding the housing 1 sideways, off the line. Then the spool-sleeve assembly 2 is removed from either end of the housing, after first retracting the set screws 14. A new spool sleeve assembly is inserted into the housing (we recommend a light lubricant on the O-rings) and the set-screws 14 screwed down. Preferably the set-screws are not bottomed.

At his point operability of the valve can be verified by connecting the air supply and operating the motive fluid, since the O-ring seal is independent of and does not require the valve being mounted in the process line. The set screws 14 prevent movement of the end ring portions 11 during this off-line testing. If operation is verified, the valve is then placed in the line, and the union nuts 4 tightened to seal the process fluid.

Advantageously, there is complete variability in orienting the motive fluid line as the valve can be placed at any rotational position, and this position can be changed by merely loosening the union nuts 4, rotating the body and retightening the union nuts 4. Also, influences and forces which affect seal of the process fluid do not affect seal of the motive fluid, and vice versa, since their seals are separate mutually isolated from each other, and from the usually anticipated factors imposed on the valve during use.

It is also an advantage, that the valve can be actuated to prevent flow of process fluid, and the downstream piping removed by disconnecting the down stream union nut 4. This feature facilitates work down stream on the system without shutting down other parts of the system.

It will also be appreciated that, although this specific embodiment has been illustrated and described in detail by way of example, various modifications may be made without departing from the spirit and scope of the invention. Accordingly, the invention is not to be limited except as by the appended claims.

What is claimed is:
1. A pinch valve comprising:
 a hollow housing having end faces defining openings at opposite ends and means for communicating with a motive fluid control system;
 a spool-sleeve comprising a removable flexible resilient elastomeric sleeve extending through the housing and defining a conduit for flowing fluid and a rigid annular portion proximate to each end of the spool-sleeve, the spool-sleeve having end faces effectively flush with the end faces of the housing;
 first seal means for sealing the spool-sleeve at the rigid annular portions with the inside wall of the housing so that motive fluid introduced into the housing cavity will pinch the sleeve portion of the spool-sleeve and will be effectively sealed against escape;
 releasable positioning means interengagable between the housing and each rigid annular portion for fixing the axial position of each rigid annular portion against movement;
 second seal means at each end face of the spool-sleeve for sealing the pinch valve when installed in a pipe system, said second seal means comprising at least one circular bead formed in the end face at each end of the spool-sleeve;

an end connector adjacent each opening of the housing and having means for connecting to a piping system, each end connector having a sealing face for engaging the seal bead on each end face of the spool-sleeve;

a union device on each end connector having means interengagable with the seal bead; and a motive fluid control system for controllably pressurizing motive fluid inside the housing to pinch the sleeve.

2. A flow device with a resilient elastomeric sleeve for use in a pipe system comprising:

a hollow housing having openings at opposite ends and inner circular wall portions at the ends and a generally central opening for communicating with a motive fluid line;

a removable flexible resilient elastomeric sleeve inside the housing, defining a motive fluid space between the sleeve exterior and the interior of the housing and having a rigid annular portion proximate to each end of the sleeve and integral therewith, each rigid annular portion being radially concentrically aligned in the housing at a respective one of the circular wall portions;

exterior sealing means near each end of the sleeve acting circumferentially between the respective rigid annular portion and inner circular wall portion for sealing the motive fluid space between the sleeve and the housing independently of any portion of the piping system in which the flow device is used;

releasable means co-acting with the housing and the sleeve for fixing the axial position of said exterior sealing means relative to the housing; and means for sealing the device when mounted in a pipe system effective to seal process material flowing through the device against leakage;

whereby when the device is off-line it may be tested maintaining effective seal of motive fluid in the motive fluid space due to the sealing effect of the exterior sealing means between the housing and the sleeve, and when the device is online the seal is also maintained, and the device may be installed in or removed from a pipe system while maintaining the exterior seal.

3. The flow device of claim 2, wherein said means for sealing the device when mounted in a pipe system further comprises:

an end face at each end of the sleeve effectively flush with the respective end face of the housing and interior sealing means at each end face adapted to seal against a member which is attached to the pipe system, the interior sealing means extending annularly around the end face and axially aligned with the rigid annular portion to co-act therewith to facilitate sealing of the interior sealing means;

the releasable means co-acting with the housing comprising releasable means near each end of the sleeve and also fixing the axial position of the respective interior sealing means against movement inwardly of each end;

whereby the device may be installed in and removed from a piping system without requiring disassembly of any members of the piping system and may be sealingly installed in the piping system by a releasable means for engaging the interior sealing means against a member of the piping system to establish process material seal.

4. The flow device of claim 3 wherein:

the rigid annular portions are separate end rings bonded to the sleeve; and the releasable means for fixing the axial position of the interior and the exterior sealing means is outward of the exterior sealing means and compriss means co-acting with the housing and the periphery of the end ring.

5. The flow device of claim 4 and in combination therewith:

an end connector at each end of the housing, each end connector being adapted at one side to seal against the interior sealing means at each end face, and adapted at the other side to connect to a piping system; and a union device on each end connector having means engageable with the housing for tightening the end connector against the interior sealing means.

6. The flow device of claim 4 and in combination therewith:

end connecting means placed at each end of the housing, being adapted at one side to seal against the interior sealing means at each end face, and adapted at the other side to connect to a piping system, and releasable means for mounting the device and sealing the end connecting means against the interior sealing means.

7. A flow device with a resilient elastomeric sleeve comprising a hollow housing having end faces defining openings at opposite ends and means for communicating with a motive fluid system;

a spool-sleeve comprising a removable flexible resilient elastomeric sleeve extending through the housing and defining a conduit for flowing fluid and a rigid annular portion proximate to each end of the spool-sleeve, the spool-sleeve having end faces effectively flush with the end faces of the housing;

first seal means for sealing the spool-sleeve at the rigid annular portions with the inside wall of the housing so that motive fluid introduced into the housing cavity will surround the sleeve portion of the spool-sleeve and will be effectively sealed against escape;

releasable positioning means interengageable between the housing and each rigid annular portion for fixing the axial position of each rigid annular portion against movement; and second seal means at each end face of the spool-sleeve for sealing the flow device when installed in a pipe system.

8. The flow device of claim 7 wherein the rigid annular portions are separate pieces bonded to the sleeve and wherein each rigid annular portion has a first peripheral groove and the first seal means is an elastomeric sealing ring in the respective groove, and wherein the releasable positioning means comprises a second peripheral groove in each rigid annular portion outward of the respective first peripheral groove and retractable elements extending from the housing into the second peripheral grooves.

9. The flow device of claim 7 and in combination therewith:

an end connecting means placed at each end of the housing being adapted at one side to seal against the seal means on each end face, and adapted at the other side to connect to a piping system, and releasable means for mounting the device and sealing the connecting means against the respective seal means.

10. The apparatus of claim 9 wherein the connecting means is connected to a piping system and the flow device is releasably mounted and sealed to the connecting means.

11. The apparatus of claim 7 further comprising:
the second seal means comprising at least one circular bead formed in the end face at each end of the spool-sleeve;
an end connector adjacent each opening of the housing and having means for connecting to a piping system, each end connector having a sealing face for engaging the seal bead on each end face of the spool-sleeve; and
a union device on each end connector having means interengageable with said housing to draw the end connector into sealing engagement with the seal bead; and
a motive fluid system communicating with pressurizing motive fluid inside the housing around the sleeve.

12. A flow device with a resilient elastomeric sleeve for use in a piping system comprising:
a hollow housing having openings at opposite ends and inner circular wall portions at the ends and a generally central opening for communicating with a motive fluid means;
a removable flexible resilient elastomeric sleeve inside the housing for conducting process material through the valve and engageable by motive fluid therearound;
an end face at each end of the sleeve effectively flush with the respective end face of the housing; interior sealing means at each end face adapted to seal against a member which is attached to the piping system; and
a rigid annular portion proximate to each end of the sleeve and integral therewith, the rigid annular portions fitting concentrically in the housing at the inner circular wall portions and the interior sealing means comprising a member extending annularly around the end face of the sleeve and axially aligned with the rigid annular portion to co-act therewith to facilitate sealing action of the interior sealing means when compressed, and releasable means for fixing the axial position of the interior sealing means,
whereby the device may be installed sealingly in and removed from a piping system without requiring disassembly of any members of the piping system.

13. The flow device of claim 12, wherein said releasable means comprises means co-acting with the housing and the rigid annular portion at each end to prevent movement of the interior seal inwardly upon compression.

14. The apparatus of claim 13 wherein the rigid annular portions are separate pieces bonded to the sleeve.

15. The flow device of claim 12 and in combination therewith end connecting means for placement at each end of the housing and adapted at one side to seal against the interior sealing means on each end face and adapted at the other side to attach a piping system, and releasable means for mounting the valve and sealing the connecting means against the interior sealing means.

* * * * *